US006532593B1

(12) United States Patent
Moroney

(10) Patent No.: US 6,532,593 B1
(45) Date of Patent: Mar. 11, 2003

(54) TRANSCODING FOR CONSUMER SET-TOP STORAGE APPLICATION

(75) Inventor: Paul Moroney, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 218 days.

(21) Appl. No.: 09/638,944

(22) Filed: Aug. 15, 2000

Related U.S. Application Data

(60) Provisional application No. 60/149,267, filed on Aug. 17, 1999.

(51) Int. Cl.[7] .................................................. H04N 7/18
(52) U.S. Cl. ........................ 725/142; 725/92; 725/115; 725/134; 725/142
(58) Field of Search ................................. 348/426, 444, 348/397.1, 399.1, 425.1, 425.3; 709/226; 725/91, 92, 114, 115, 120, 134; 386/52, 68, 125, 126; 375/240.02, 240.1, 240.26; 382/234, 235, 239

(56) References Cited

U.S. PATENT DOCUMENTS

| 5,357,283 A | | 10/1994 | Tesler et al. |
| 5,477,397 A | | 12/1995 | Naimpally et al. |
| 5,541,852 A | * | 7/1996 | Eyuboglu et al. |
| 5,617,142 A | | 4/1997 | Hamilton |
| 5,619,733 A | | 4/1997 | Noe et al. |
| 5,635,985 A | * | 6/1997 | Boyce et al. ................ 348/402 |
| 5,819,004 A | * | 10/1998 | Azzdegan et al. |
| 5,825,927 A | * | 10/1998 | Boyce et al. ................ 382/232 |
| 5,917,822 A | * | 6/1999 | Lyles et al. .................. 370/395 |
| 5,917,830 A | * | 6/1999 | Chen et al. ................... 370/487 |
| 5,920,354 A | * | 7/1999 | Fedele .......................... 348/446 |
| 5,923,814 A | | 7/1999 | Boyce |
| 5,933,500 A | | 8/1999 | Blatter et al. |
| 5,966,163 A | * | 10/1999 | Lin et al. ...................... 725/120 |
| 6,005,599 A | * | 12/1999 | Asai et al. ...................... 725/87 |
| 6,025,878 A | * | 2/2000 | Boyce et al. ................ 348/402 |
| 6,078,958 A | * | 6/2000 | Echeita et al. ............... 709/226 |
| 6,201,844 B1 | * | 3/2001 | Bailleul |
| 6,304,714 B1 | * | 10/2001 | Krause et al. |

FOREIGN PATENT DOCUMENTS

EP  0 627 854  12/1994

OTHER PUBLICATIONS

G. Keesman, et al., "Transcoding of MPEG bitstreams," Signal Processing:IMAGE Communication, vol. 8, pp. 481–500, 1996.

Björk, Niklas et al., "Transcoder Architectures for Video Coding," IEEE Transactions on Consumer Electronics, vol. 44, No. 1, Feb. 1998, pp. 88–98.

(List continued on next page.)

*Primary Examiner*—Andrew Faile
*Assistant Examiner*—Kieu-Oanh Bui
(74) *Attorney, Agent, or Firm*—Barry R. Lipsitz; Douglas M. McAllister

(57) ABSTRACT

A consumer set-top terminal and method that receives and stores digital programming services such as television programs for subsequent playback by the user in a manner analogous to a conventional video cassette recorder (VCR). An interface allows the terminal's user to control a transcoding proces based on the desired quality level for the transcoded data, e.g., high, medium or low. The transcoding is provided without the expense and complexity of a full encoder. By performing transcoding at the terminal, the bit rate of the data can be reduced sufficiently to allow economical storage at the terminal. Moreover, the user can set the quality level to be different for different programs, different parts of the same program, or for different channels. The user input can be received via an interface, such as an on-screen display, which is optionally integrated with electronic program guide data. The user input can be established beforehand as well.

21 Claims, 7 Drawing Sheets

OTHER PUBLICATIONS

Staff of Cable Television Laboratories Inc., "Digital TV Solutions," From the Labs: Cable World, Feb. 1, 1999.

Gebeloff,Rob., "The Missing Link," http://www.talks.com/interactive/misslink–x.html.

* cited by examiner

|  | 8 PM | 9 PM | 10 PM |
|---|---|---|---|
| ABC | MAJOR LEAGUE BASEBALL: YANKEES VS. METS (3 HOURS) | | |
| TRAVEL | CRUISES (2 HOURS) | | MIAMI'S BEACHES (1 HOUR) |
| PPV | TERMINATOR (CONTINUED) | MUSICAL SPECIAL (3 HOURS) | |
| FOX | COMEDY (1 HOUR) | SITCOM (1 HOUR) | LOCAL NEWS (1 HOUR) |

SELECT A PROGRAM TO VIEW OR RECORD

FIG.5(a)

YOU HAVE SELECT "CRUISES"

PLEASE SELECT ONE:

1. VIEW

2. RECORD

3. VIEW AND RECORD

4. EXIT

YOU HAVE CHOSEN TO RECORD "CRUISES"

THE RUN TIME IS 2 HOURS.

PLEASE SELECT A RECORD QUALITY:

| | HOURS OF STORAGE THAT WILL REMAIN: |
|---|---|
| 1. HIGH | 3 HOURS |
| 2. MEDIUM | 6 HOURS |
| 3. LOW | 8 HOURS |
| 4. EXIT | |

FIG.5(c)

TRANSCODING FOR CONSUMER SET-TOP STORAGE APPLICATION

This application claims the benefit of U.S. provisional application No. 60/149,267, filed Aug. 17, 1999.

BACKGROUND OF THE INVENTION

The present invention relates to a consumer set-top terminal that receives and stores digital programming services such as television programs for subsequent playback by the user.

Recently, a new product family has emerged in the set-top industry based upon hard drives inside set-top boxes. These drives are used to store video programs much as with a video cassette recorder (VCR), but without the removeability of the tape media. These devices are extremely expensive, as they include MPEG encoders to process incoming analog television signals for storage on the hard drive in a compressed, digitized format.

Once the expected transition to all digital programming services is made in the industry, the set-top plus hard drive can store video at a far lower cost, because no encoder sub-system would be required. The bits received from the incoming transmissions would simply be stored as they are received, as MPEG transport packets. Unfortunately, the incoming digital rates are set by the source video providers and, in MPEG-2 systems, for instance, can range from about 1.5 Mbps up to 15 Mbps. To the consumer, this will translate to storage capacities that are unpredictable and uncontrollable. Moreover, no quality setting is possible, and the disk will have to be sized big enough to store a program at its highest bitrate of 15 Mbps, which may result in use of an oversize hard drive, thereby raising costs. It will at least produce less useable capacity and confuse the consumer.

Accordingly, it would be desirable to provide an approach to set-top storage for all-digital inputs that solves this problem, that is still low cost, yet provides the consumer with a quality/storage capacity choice that is analogous to a VCR.

The system should allow a user to store one or more programs at a set-top terminal for subsequent playback at the user's convenience.

The system should store the received programming in a compressed format to reduce the required storage capacity. In particular, the system should provide a transcoder at the terminal to transcode received programming that is already compressed and digitized, e.g., to transcode to a reduced bit rate. Furthermore, the transcoding should be responsive to a user-determinable parameter, such as desired quality level for the programming. In this manner, the user can control the amount of storage space that is used by the transcoded programs.

Optionally, it would further be desirable to provide a user interface such as an on-screen program guide to assist the user in storing the programs.

The interface should provide functions that are similar to a conventional video cassette recorder (VCR) which store programs in an analog format. These functions include, e.g., play, fast forward, rewind, fast rewind, pause, and incremental (scan) forward and reverse.

The system should be implementable at a relatively low cost which is economically feasible for mass-produced consumer set-top devices. The system should be implementable within a set-top device or as a peripheral to a set-top device.

The present invention provides a system having the above and other advantages.

SUMMARY OF THE INVENTION

The present invention relates to a consumer set-top terminal that receives and stores digital programming services such as television programs for subsequent playback by the user.

In particular, the invention provides an application of transcoding to consumer products that store video, e.g., on hard drives or on tape, where the storage and playback behavior correspond to that expected by a consumer from existing devices, such as VCRs, and at a relatively low cost.

The present invention provides a transcoder at a terminal that transcodes the received compressed data to a compressed format, e.g., with a lower bit rate, in accordance with a user-selectable parameter. For example, the user can select a high, medium or low quality level for transcoding that is analogous to the use of an analog VCR tape in different time storage modes, e.g., two, four or six hours, respectively.

For this analogy, note that, in the two hour mode, the analog tape moves relatively fast so that a given amount of data is stored in a larger tape area, resulting in a higher quality. Conversely, in the six hour mode, the analog tape moves relatively slowly so that a given amount of data is stored in a smaller tape area, resulting in a lower quality. Again, this is an analogy only that relates the digital storage of the present invention to the analog tape concept that may be more readily understood by the user. For digital storage, each data bit is stored, and the quality is related to the number of bits that represent an image.

For this digital storage, any type of storage device can be used, such as a hard drive, floppy disk drive, magnetic tape, or optical storage media (DVD, CD, laser disc). Moreover, the storage medium may be removable by the user. Thus, when the medium becomes full, the user can insert a replacement.

By selecting the quality level, the user therefore has an idea of the amount of storage that will be consumed when storing a program. Additionally, the user has the option of storing particularly favorite programs at a higher quality. For example, a user may desire to store a movie with special effects with a high quality, while a sports event is stored at a medium quality, and a news program or lecture is stored at a lower quality. Of course, even the lower quality should provide an acceptable viewing experience. Thus, the quality level is a relative term, not an absolute one.

The invention thus uses transcoding at a user terminal, which is present in a user's home or business, for example, to provide additional features and functions to the user. This enhances the user's enjoyment and convenience. The revenues of the system operator are also enhanced since these features will attract new subscribers to the network, and lead the users to order additional programming at an additional cost.

A particular method for storing data at a user terminal from a compressed digital data stream received thereat, includes the step of transcoding at least a portion of the received data stream at the terminal to provide corresponding transcoded data. The transcoded data is stored at a storage device associated with the terminal. Additionally, a user input is received that is indicative of a desired transcoding parameter, where the transcoding step is responsive to the desired transcoding parameter.

A corresponding user terminal is also presented.

BRIEF DESCRIPTION OF THE DRAWINGS

FIG. 5(a) illustrates a first on-screen display of a user interface in accordance with the present invention.

FIG. 5(b) illustrates a second on-screen display of a user interface in accordance with the present invention.

FIG. 5(c) illustrates a third on-screen display of a user interface in accordance with the present invention.

DETAILED DESCRIPTION OF THE INVENTION

The present invention relates to a consumer set-top terminal that receives and stores digital programming services such as television programs for subsequent playback by the user.

The primary concept blends the concepts of low cost transcoding developed with the needs of a set-top terminal that is equipped with a storage device such as a hard drive. Transcoding is defined as a reprocessing of compressed video from one rate to another, and/or from one resolution to another (for example HD TV to SD TV), or from one standard to another (for example MPEG-1 to MPEG-2). This discussion will focus on the first of these (i.e., bit rate transcoding), as it holds the highest potential of retaining a very low cost, but the ideas apply generally to any type of transcoding.

For purposes of the present disclosure, transcoding is defined as decoding a compressed signal only to the extent necessary to effect requantization, and then performing only those encoding steps necessary to produce a lower rate bit stream from the requantized data. The intent is to provide a lower rate signal without the high cost and complexity of a full encoder, and potentially without a full decoder, at the user terminal. The lower the rate, the more reduction in quality occurs.

The decoding/re-encoding sequence could be performed by combining in tandem a full decoder with a full encoder as was provided in the prior art (FIG. 1), but this approach requires an expensive encode subsystem. In addition, quality suffers even more when such a process is used, due to the full decoding and re-encoding steps performed. In accordance with the present invention, the decode/encode tandem approach is simplified to eliminate many steps, and furthermore, many of the decisions made by the original encoder (at the source) are known for the purposes of decoding, and can thus be reused, again saving complexity and cost.

Figure 2:
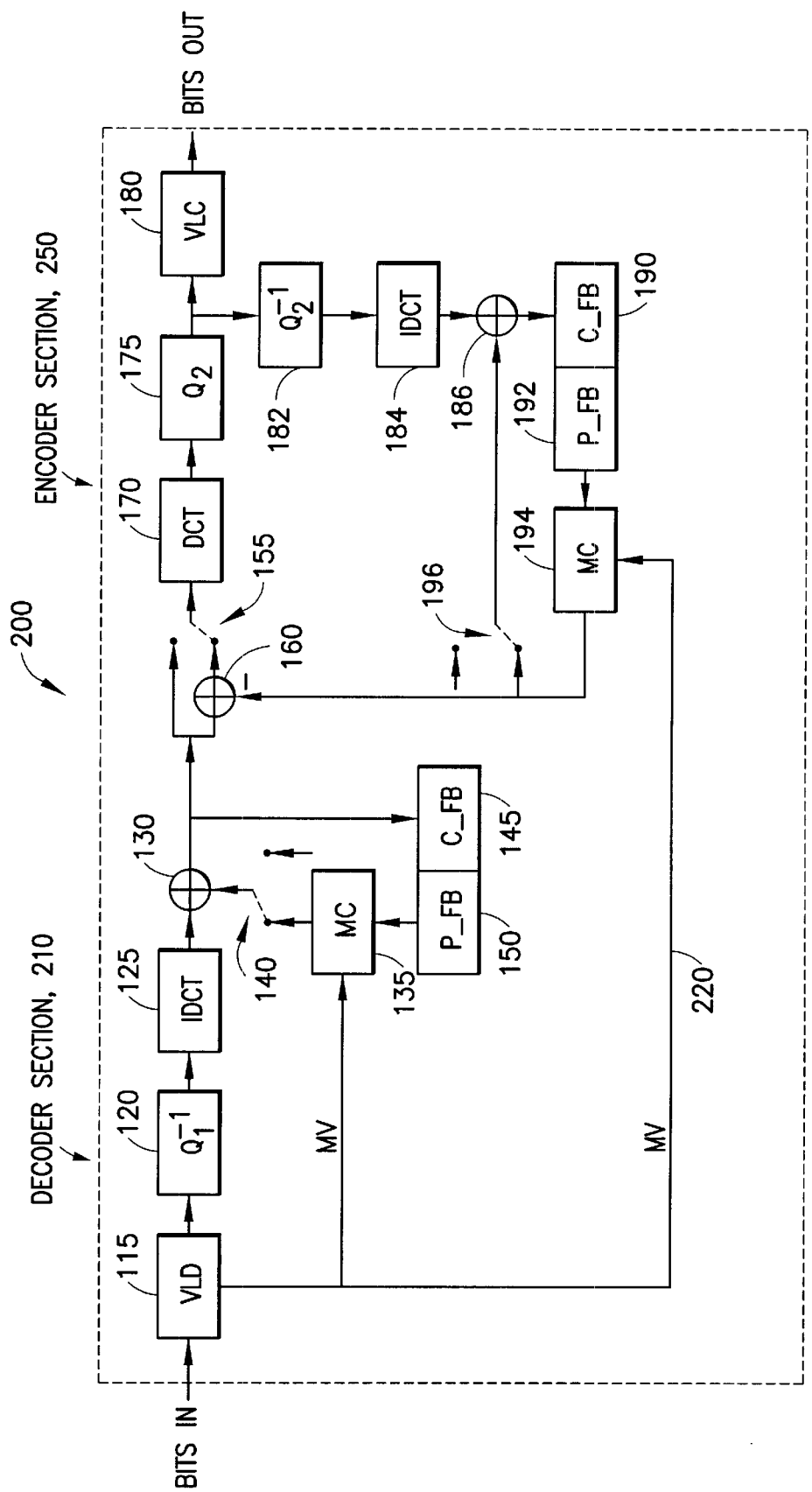
FIG. 2 illustrates an efficient transcoder which removes motion estimation processing.

A primary benefit results from reusing the motion estimation process (i.e., reusing motion vectors to avoid the need for motion estimation in the transcoder—FIG. 2), which is arguably the most expensive part of the overall encode process. This reuse tends to also maintain the block types (I, P, B) during transcoding; otherwise, the motion vectors may not be applicable at all. Other decisions can be reused as well, such as field/frame mode.

While the invention may be used with any transcoding scheme, the transcoding schemes described in U.S. Pat. No. 5,619,733 and in Wang, L. et al., "Adaptive Rate Control for MPEG Transcoder", 1999 *IEEE International Conference on Image Processing,* Kobe, Japan, Oct. 28, 1999, for example, are well suited for use with the techniques described herein.

Figure 1:
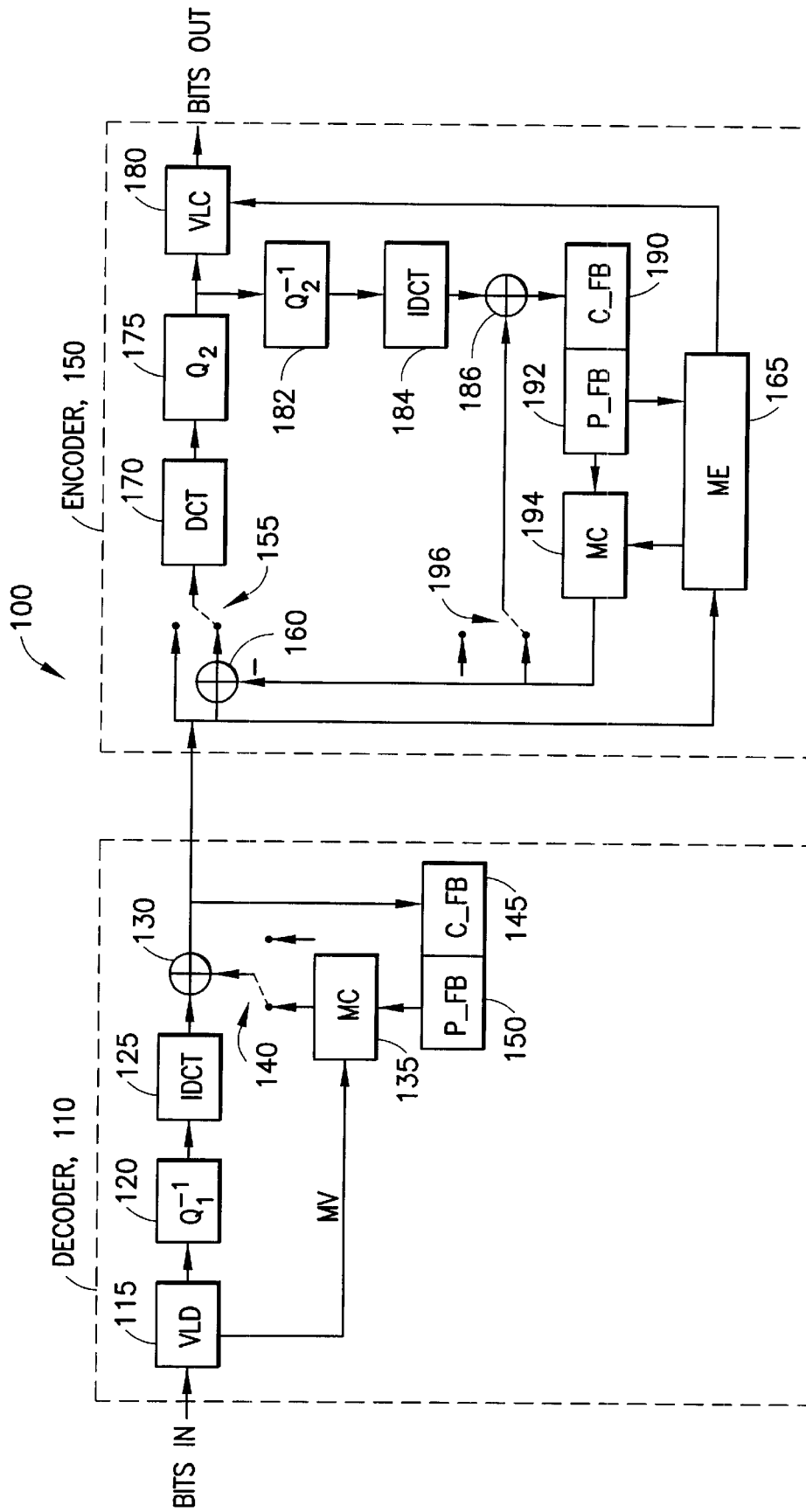
FIG. 1 illustrates a prior art approach which combines a full decoder with a full encoder.

FIG. 1 illustrates the prior art technique of providing a full decoder cascaded with a full encoder for an MPEG bitstream. The cascaded components first decode a compressed bitstream, e.g. that is obtained from a library or transmission source, to obtain a reconstructed video sequence. The reconstructed video sequence is then re-encoded by a conventional encoder to obtain a different compressed bitstream that is suitable for transmission, e.g., to a decoder population.

In particular, the prior art approach used a decoder 110 and a full encoder 150. A pre-compressed video bitstream is input to a Variable Length Decoder (VLD) 115. A dequantizer function 120 processes the output of the VLD 115 using a first quantization step size, $Q_1$. An Inverse Discrete Cosine Transform (IDCT) function 125 processes the output of the inverse quantizer 120 to provide pixel domain data to an adder 130. This data is summed with either a motion compensation difference signal from a Motion Compensator (MC) 135 or a null signal, according to the position of a switch 140.

The code mode for each input macroblock (MB), either intra or inter mode, embedded in the input precompressed bit stream, is provided to the switch 140. The output of the adder 130 is provided to the encoder 150 and to a Current Frame Buffer (C_FB) 145 of the decoder 110. The MC function 135 uses data from the current FB 145 and from a Previous Frame Buffer (P_FB) 150 along with motion vector (MV) data from the VLD 115.

In the encoder 150, pixel data is provided to an intra/inter mode switch 155, an adder 160, and a Motion Estimation (ME) function 165. The switch 155 selects either the current pixel data, or the difference between the current pixel data and pixel data from a previous frame, for processing by a Discrete Cosine Transform (DCT) function 170, quantizer 175, and Variable Length Coding (VLC) function 180. The output of the VLC function 180 is a bitstream that is transmitted to a decoder. The bitstream includes Motion Vector (MV) data from the ME function 165.

Note that the quantizer uses a quantization level $Q_2$ that could be controlled by a user input, although this approach has the disadvantage of the aforementioned high cost and complexity of the prior art. In such an embodiment, the bit output rate would be adjusted by changing $Q_2$.

In a feedback path, processing at an inverse quantizer 182 and an inverse DCT function 184 is performed to recover the pixel domain data. This data is summed with motion compensated data or a null signal at an adder 186, and the sum thereof is provided to a Current Frame Buffer (C_FB) 190. Data from the C_FB 190 and a P_FB 192 are provided to the ME function 165 and a MC function 194. A switch 196 directs either a null signal or the output of the MC function 194 to the adder 186 in response to an intra/inter mode switch control signal.

This approach is computationally intensive due to the full decompression of the pre-compressed data to the pixel domain, and the full re-compressing of the intermediate reconstructed video frames, including motion compensation and estimation processing for the inter-frame coded data. Additionally, the implementation cost of the cascaded decoder and encoder is relatively high due to the need for one full MPEG decoder and one full MPEG encoder.

Computer simulation results have indicated that if the picture type for each frame is maintained, the motion vectors decoded from the decoder can be used for motion compensation in the encoder without significantly impairing the perceptual quality of the resulting image. This indicates that motion estimation, the most expensive operation, can be removed from the cascaded decoder/encoder approach of the prior art. Such a scheme, in accordance with the present invention, is discussed in connection with FIG. 2, below.

FIG. 2 illustrates a transcoder in accordance with the invention wherein motion estimation has been removed from the encoder. Like-numbered elements correspond to the elements of FIG. 1. The transcoder 200 includes a decoder section generally designated 210 and portions of an encoder (preferably only those portions necessary to produce a lower rate bit stream from the requantized data), generally designated 250. Here, the motion vectors from the VLD 115 are provided to the MC 194 in the encoder 250.

The transcoder architecture of FIG. 2 will therefore generate a new bitstream and a new bit rate, but with the same video format block types (i.e., predicted and non-predicted) and other parameters, and therefore the same motion vectors, as the incoming compressed bitstream.

Again, while FIG. 2 discloses a particularly efficient transcoder, the invention is compatible with essentially any known bit rate transcoder, and provides more efficient transcoding. The much simplified transcoder approach disclosed herein (and even simpler forms) can be implemented at low cost, and obviates the requirement for discrete decoder and encoder devices. Moreover, full software digital signal processor (DSP) implementations are feasible with the simplified approach of the present invention.

The set-top design can operate as follows. The consumer may choose from among a number of quality levels, e.g., three, for storage. For example, a high quality mode (analogous to using an analog video tape in a two hour mode), a medium quality mode (analogous to using an analog video tape in a four hour mode), or low quality mode (analogous to using an analog video tape in a six hour mode).

As mentioned, the received bitstream may come in to the terminal at 15 Mbps, if we presume the case of standard resolution TV (MPEG-2 main level main profile). Thus, for each quality level, the received bitstream must be transcoded down to the rate that fits the program into the right amount of storage capacity. Consider the specific case of a program such as a movie received at 15 Mbps, and transcoded in real time down to either 6 Mbps, 3 Mbps, or 2 Mbps. For illustration, assume the storage device at the terminal is a hard drive with a 6 GB capacity. At the highest video quality setting (transcoding down to 6 Mbps), the consumer could store 2.2 hours of video, i.e., (6 Gbytes×8 bits/bytes)/6 Mbits/sec=8,000 sec.=133 minutes=2:13 hours. At medium quality, the consumer could store 4.4 hours of programming, and at the lowest quality setting, the consumer could store 6.6 hours of programming.

Note that the transcoding is easily capable of variable bit rate compression, so that it is not necessary to code to exactly 6, or 4, or 2 Mbps for each case, but only to an average rate over the entire program. Variable rate coding produces far greater quality that fixed rate coding would, given equal average rates. Digital video disc (DVD) movies are examples of variable rate coded programs. A DVD movie with a two hour run time is stored at an average rate of about 5 Mbps, but can have peaks as high as 10 Mbps, when the scene demands it.

If desired, however, the user could set a fixed bit rate for the transcoding.

Note that the user input, which sets the transcoding quality level via a mechanism we refer to as a "quality dial," is arbitrary, as transcoding can produce whatever bit rate one wishes. The bit rate can even be continuously adjustable, although the consumer may not be comfortable with such a dial, being so different from the VCR experience of the last 30 years.

The consumer may also view the transcoded program during reception thereof. Then, the user may select an increased quality level for subsequent portions of a movie, for example. As another example, a user viewing an educational program may wish to enhance the quality of subsequent images, e.g., for a doctor viewing a surgery, or for a hobbyist viewing a sewing program, or for a student viewing a slide that is displayed in a lecture. The quality level can then be reduced by the user once the critical segments have passed.

A minimum or floor bit rate may be enforced by the terminal to maintain some minimum image quality that is acceptable to most viewers.

Similarly, a maximum or ceiling bit rate can correspond to the bit rate of the received data at the terminal, or to some predetermined lower level. Generally, transcoding to a higher bit rate is not useful.

Figure 3:
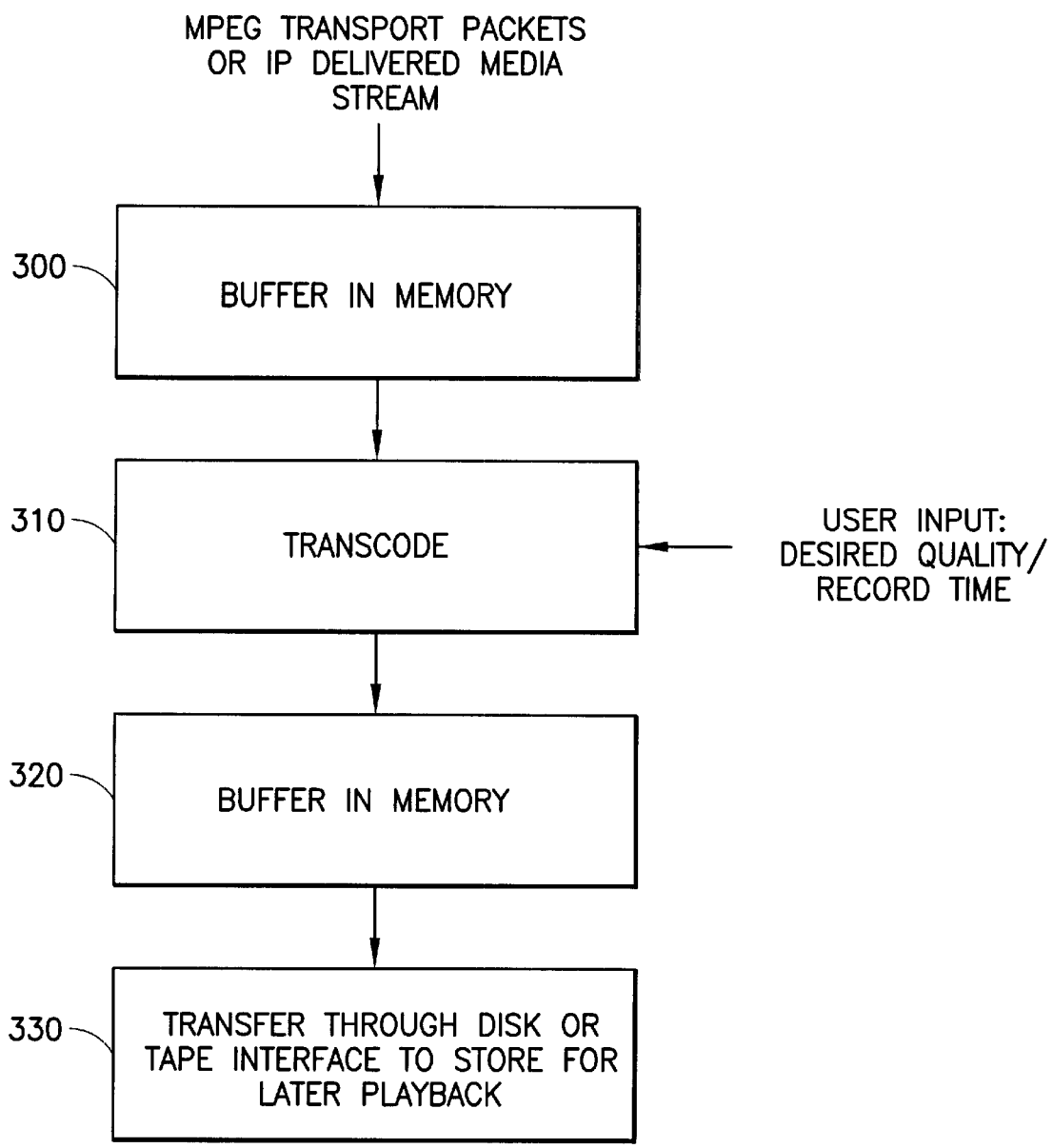
FIG. 3 illustrates a method for transcoding data at a terminal in response to a user input in accordance with the present invention.

FIG. 3 illustrates a method for transcoding data at a terminal in response to a user input in accordance with the present invention.

At block 300, compressed digital programs, which may comprise MPEG transport packets or an Internet Protocol (IP)-delivered media stream, for instance, are buffered in a memory at the user terminal. Generally, digital programs can be of any format in terms of spatial resolution, frame rate, color sampling, interlaced/progressive, etc.; and they can be preencoded at any rate, either constant bit rate (CBR) or variable bit rate (VBR).

At block 310, the buffered data is transcoded based on a user input. The buffered data may be requantized using existing motion vectors and other parameters under an appropriate rate control scheme to achieve a new rate.

The user input may comprise a desired quality or the analogous concept of an analog VCR tape record time, as discussed previously.

At block 320, the transcoded data is again buffered in a memory, and at block 330, the transcoded data is transferred, e.g., through a disk or tape interface, to a storage device to be stored for later playback by the user.

Figure 4:
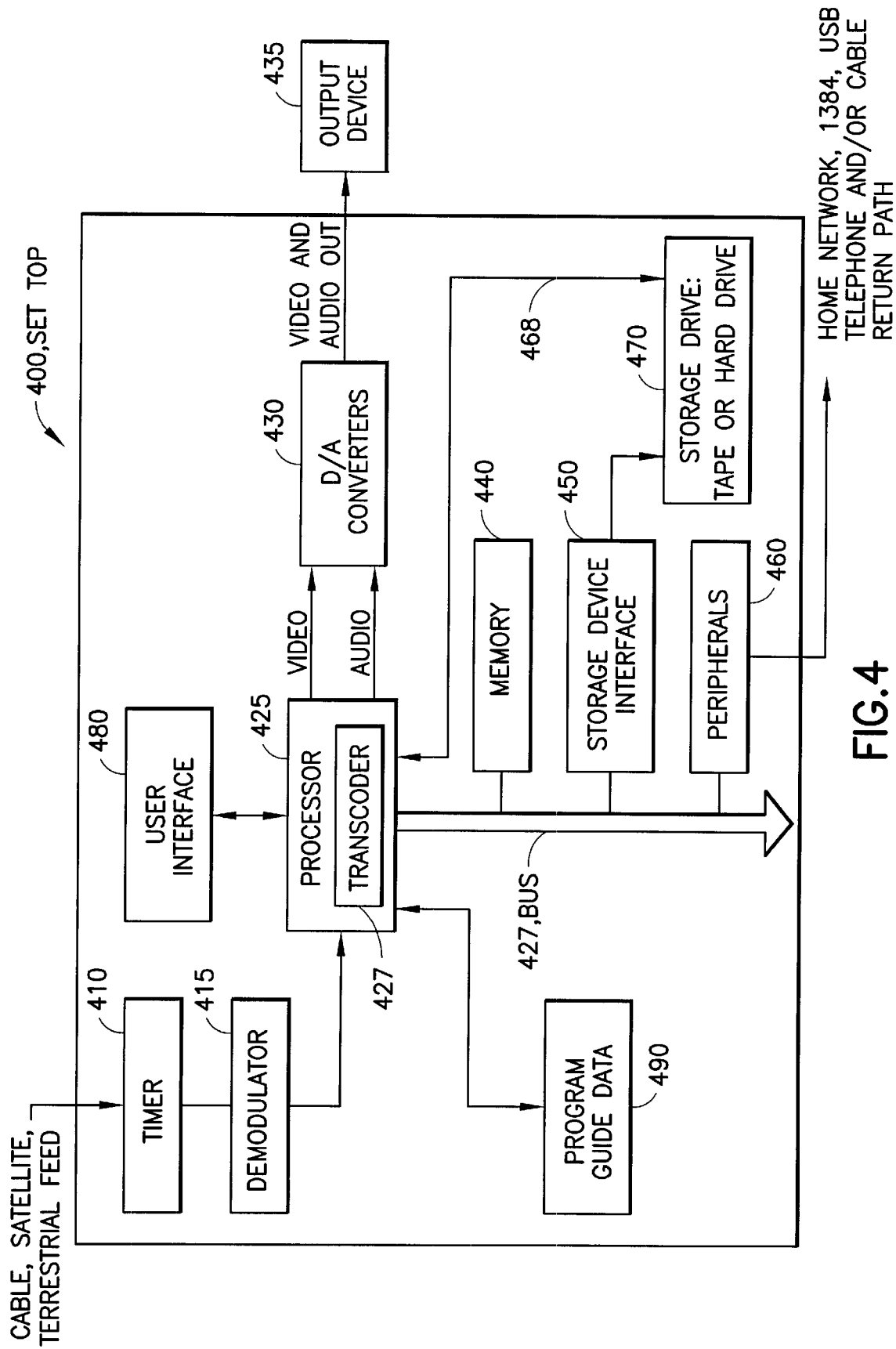
FIG. 4 illustrates a user terminal in accordance with the present invention.

FIG. 4 illustrates a user terminal in accordance with the present invention.

The terminal 400 receives compressed digital programming at a tuner 410, e.g., via a cable satellite or terrestrial feed. The received signal is demodulated at a demodulator 415 and provided to a processor 425, which may be implemented using hardware, firmware and/or software. The processor 425 includes a low cost transcoder 427, which may be the transcoder 200 of FIG. 2, or any other suitable design.

For maximum flexibility, the processor 425 should be capable of decoding digital video, such as MPEG-2 video in a conventional manner, and also of transcoding video in accordance with the invention. Note that low cost transcoding is between 1.5 and 2 times more complex than pure decoding.

The processor may also provide various functions for the playback of the stored video, including trick modes such as fast forward, pause, slow scan, and so on, which are all effects that are expected by the consumer who is familiar with the age-old VCR. A path 468 enables the processor 425 to retrieve the stored data from the storage device 470 for playback.

It should also be appreciated that the identical approach applies to the case of true removable storage media, such as tape or advanced floppy disks, or even removable hard media. Such a product could produce the exact experience of a VCR.

The processor 425 also communicates with a user interface 480 for receiving the user input for transcoding, and a program guide data function 490.

The optional program guide data function 490 receives data, typically with the programming services, for providing a graphical display of a schedule for the programs that are playing currently and in the near future. In accordance with the invention, and as discussed further in connection with FIGS. 5(a)–(c), this data can be used to enable the user to select a program to transcode and store.

The processor 425 may decode and output digital video and audio to a D/A converter 430 to provide corresponding analog signals which are, in turn, provided to an output device 435, such as a television with speakers.

A bus 427 allows the processor 425 to communicate with a memory 440, which may buffer the received data prior to and following transcoding, a storage device interface 450, which formats the transcoded data for storage at the storage device 470 (e.g., tape or hard drive), and optional peripherals 460, which may route data to a home network, an IEEE 1394 interface, a universal serial bus (USB), a telephone line, and/or cable return paths.

Note that the transcoding functionality (e.g., circuitry and other components) can be provided in a single set-top terminal, although this is not required. The functionality can also be provided, in whole or in part, in a peripheral device. Any such peripheral device is considered to be part of the terminal apparatus 400.

FIG. 5(a) illustrates a first on-screen display of a user interface in accordance with the present invention.

The display 500 is generated from the program guide data function 490 of FIG. 4 in a known manner. The display lists various programs that are available on the different channels. For example, the available channels include "ABC", "TRAVEL", "PPV" (pay-per-view), and "FOX". Typically, the guide 500 can be scrolled to the left or right to view different program times, and up or down to view additional channels. This may be accomplished by the user, e.g., via a hand-held remote control, voice control interface, or other means.

FIG. 5(b) illustrates a second on-screen display of a user interface in accordance with the present invention.

Here, assume the user has selected the program entitled "CRUISES" from the "TRAVEL" channel, which runs from 8 pm to 10 pm. The display 550 informs the user of his selection, and asks him whether he would like to view the program only, record it only, both view and record, or exit the screen. The user can make his choice again using the hand-held remote control.

FIG. 5(c) illustrates a third on-screen display of a user interface in accordance with the present invention.

The display 580 confirms that the user has chosen to record the program "CRUISES", and that the run time is two hours. The user is then asked to select a record quality, e.g., high, medium, or low, or to exit the screen. The user can make his choice again using the hand-held remote control, given displayed estimates of available storage space.

Note that the user input for controlling the transcoding can be described in a variety of ways in the interface. For example, the analogous VCR tape record time can be expressed, e.g., 2, 4 or 6 hours. Moreover, for marketing purposes, the high, medium or low quality can be expressed as "super", "enhanced", and "standard" qualities, respectively, or the like. The quality level can also be expressed on a numeric scale, such as from 1–10.

Note that an on-screen interface is not required to receive the user input for transcoding. Various other interface options are possible, such as a mechanical dial ("quality dial") or switch. Or, a separate display can be provide in the hand-held interface that indicates the quality level settings using know techniques to communicate from the set-top to the remote control.

Another option is for the user to input a desired default quality level beforehand such that any program that is subsequently recorded is transcoded at the corresponding quality level. Appropriate data can be stored at the terminal for this purpose. A further related option is for the desired quality level to be stored for particular channels. For example, the user may desire to have a high quality for the "PPV" channel, and a medium quality for all other channels.

Thus, the user input for a program can be established prior to transcoding and storing. Moreover, the user input can designates respective desired transcoding parameters for corresponding specified channels prior to the transcoding and storing.

It is also possible for the user to designate that a program is to be stored prior to the run time of the program.

Moreover, as mentioned, the user may dynamically change the quality level as the transcoding (and concurrent display of the transcoded program) progresses. To this end, it may be desirable to provide an on-screen display of a small icon in the corner of the TV screen that indicates the currently-set quality level.

Accordingly, it can be seen that the present invention provides a consumer set-top terminal that receives and stores digital programming services such as television programs for subsequent playback by the user in a manner analogous to a conventional video cassette recorder (VCR). An interface allows a user to control the transcoding based on the desired quality level for the transcoded data, e.g., high, medium or low. By performing transcoding at the terminal, the bit rate of the data can be reduced sufficiently to allow economical storage at the terminal. Moreover, the user can set the quality level to be different for different programs, or for different channels. The user input can be received via an interface, such as an on-screen display, which is optionally integrated with electronic program guide data.

Although the invention has been described in connection with various preferred embodiments, it should be appreciated that various modifications and adaptations may be made thereto without departing from the scope of the invention as set forth in the claims.

What is claimed is:

1. A method for storing data at a user terminal from a compressed digital data stream received thereat, comprising the steps of:

receiving a user input that is indicative of a desired transcoding parameter;

transcoding at least a portion of the received data stream at the terminal in accordance with the desired transcoding parameter to provide corresponding transcoded data at a variable bit rate which corresponds to an average bit rate over a predetermined time period; and storing the transcoded data at a storage device associated with the terminal at said variable bit rate;

wherein the stored transcoded data is available for subsequent playback by the user.

2. The method of claim 1, wherein:

the transcoding parameter comprises a quality level for the transcoded data that is selected by the user from a plurality of available quality levels.

3. The method of claim 2, wherein:

the desired quality level designates a quantization level used in said transcoding step.

4. The method of claim 1, wherein:

the transcoding parameter comprises a resolution for the transcoded data that is selected by the user from a plurality of available resolutions.

5. The method of claim 4, wherein:

the transcoded data comprises television data; and the plurality of available resolutions comprise standard definition television (SDTV) and high-definition television (HDTV).

6. The method of claim 1, wherein:

the transcoding parameter comprises a format for the transcoded data that is selected by the user from a plurality of available formats.

7. The method of claim 1, wherein:

the transcoding parameter comprises a bit rate for the transcoded data that is selected by the user from a plurality of available bit rates; and the transcoded data is provided at a variable bit rate that corresponds, when averaged, to the user-selected bit rate.

8. The method of claim 1, wherein:

the received data stream comprises at least one of audio and video data.

9. The method of claim 1, wherein the transcoding step:

decodes the received data stream to only the extent necessary to effect requantization; and performs only the encoding steps necessary to produce a lower rate bit stream from the data after requantization.

10. The method of claim 9, wherein the encoding does not perform motion estimation.

11. The method of claim 1, comprising the further step of:

decompressing at least one of the received data or the transcoded data stream to obtain decompressed data, and providing the decompressed data to an output device concurrently, at least in part, with said transcoding step.

12. The method of claim 1, wherein the received data stream and the corresponding transcoded data comprise at least one video and/or audio program, comprising the further steps of:

providing guide data for presenting an on-screen display to inform the user of the availability of the program; and enabling the user input to be provided in accordance with the on-screen display.

13. The method of claim 1, comprising the further step of:

providing a user interface for informing the user of the plurality of available transcoding parameters, and for receiving the user input.

14. The method of claim 1, comprising the further step of:

providing a user interface for receiving the user input.

15. The method of claim 14, wherein:

the user interface is an on-screen interface.

16. The method of claim 1, wherein:

the received data stream comprises MPEG transport packets.

17. The method of claim 1, wherein:

the received data stream comprises an Internet Protocol-delivered media stream.

18. The method of claim 1, wherein:

the storage device comprises at least one of a hard drive and a tape.

19. The method of claim 1, wherein:

the storage device comprises a user-removable storage medium.

20. A user terminal for storing data from a compressed digital data stream received thereat, comprising:

an interface for receiving a user input that is indicative of a desired transcoding parameter for the data stream;

a transcoder responsive to said user input for decoding the data stream to the extent necessary to effect requantization thereof and for performing the encoding steps necessary to produce a lower average rate variable bit rate stream from the data after requantization, thereby providing variable bit rate transcoded data dependent on said user input and which corresponds to an average bit rate over a predetermined time period; and a storage device for storing the variable bit rate transcoded data;

wherein the stored transcoded data is available for subsequent playback by the user.

21. A user terminal in accordance with claim 20, wherein said encoding steps do not perform motion estimation.

* * * * *